(12) United States Patent
Henuset et al.

(10) Patent No.: US 6,827,832 B2
(45) Date of Patent: Dec. 7, 2004

(54) ELECTROCHEMICAL CELL AND PROCESS FOR REDUCING THE AMOUNT OF ORGANIC CONTAMINANTS IN METAL PLATING BATHS

(75) Inventors: Yves Michel Henuset, Montreal (CA); Joel Fournier, Montreal (CA); Barry MacDougall, Ottawa (CA); Michael Gattrell, Ottawa (CA)

(73) Assignee: National Research Council of Canada, Ontario ( * ) Notice: Subject to any disclaimer, the term of this patent is extended or adjusted under 35 U.S.C. 154(b) by 0 days.

(21) Appl. No.: 09/742,420

(22) Filed: Dec. 22, 2000

(65) Prior Publication Data

US 2003/0089622 A1 May 15, 2003

Related U.S. Application Data

(60) Provisional application No. 60/171,477, filed on Dec. 22, 1999.

(51) Int. Cl.[7] ................................................ C02F 1/461
(52) U.S. Cl. ........................ 205/101; 205/99; 205/688; 205/703; 204/263; 204/264; 204/DIG. 13
(58) Field of Search ........................... 205/101, 99, 688, 205/703; 204/263, 264, DIG. 13

(56) References Cited

U.S. PATENT DOCUMENTS

| | | | | |
|---|---|---|---|---|
| 4,260,463 A | * | 4/1981 | Rideout ...................... | 205/703 |
| 5,230,782 A | * | 7/1993 | Downes, Jr. et al. | 204/DIG. 13 |
| 5,756,874 A | * | 5/1998 | Steward ...................... | 205/703 |

* cited by examiner

*Primary Examiner*—Arun S. Phasge
(74) *Attorney, Agent, or Firm*—J. Wayne Anderson

(57) ABSTRACT

The invention disclosed relates to an electrochemical process for decreasing high levels of organic contaminants in metal plating baths. The process involves breaking down the organic contaminants in an electrochemical cell by electrochemical oxidation. The electrochemical cell includes an anode comprising an active material which is stable at low (acid) pH and at the high electrical potential required to break down the organic contaminants by oxidation. Typical examples of such anodes include a valve metal substrate coated with doped tin dioxide, lead dioxide, or platinum-based materials, the latter in some instances being coated on a high surface area valve metal substrate.

31 Claims, 4 Drawing Sheets

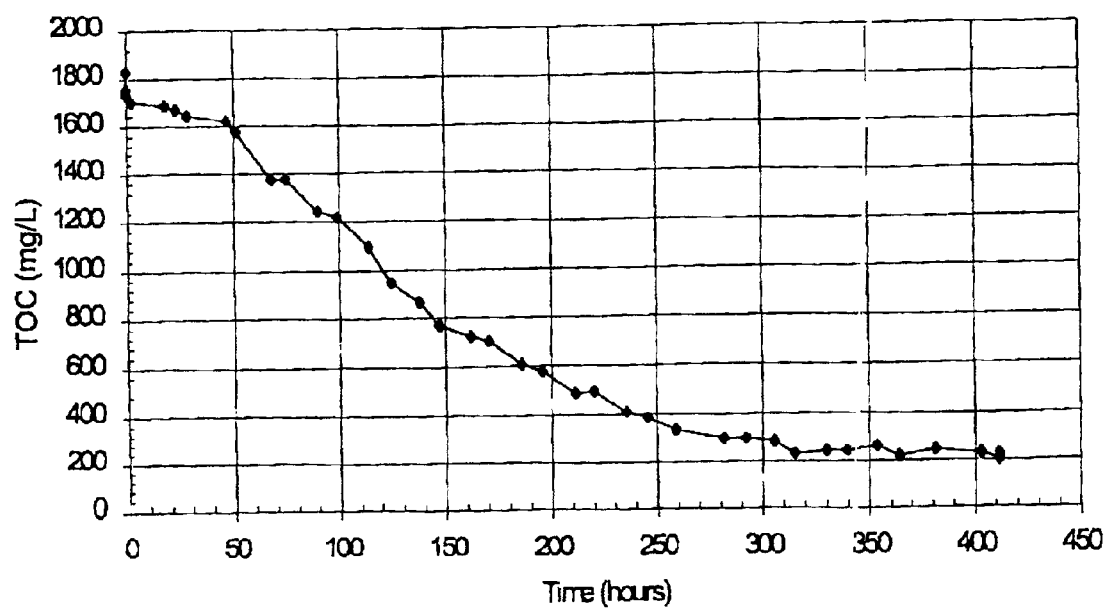

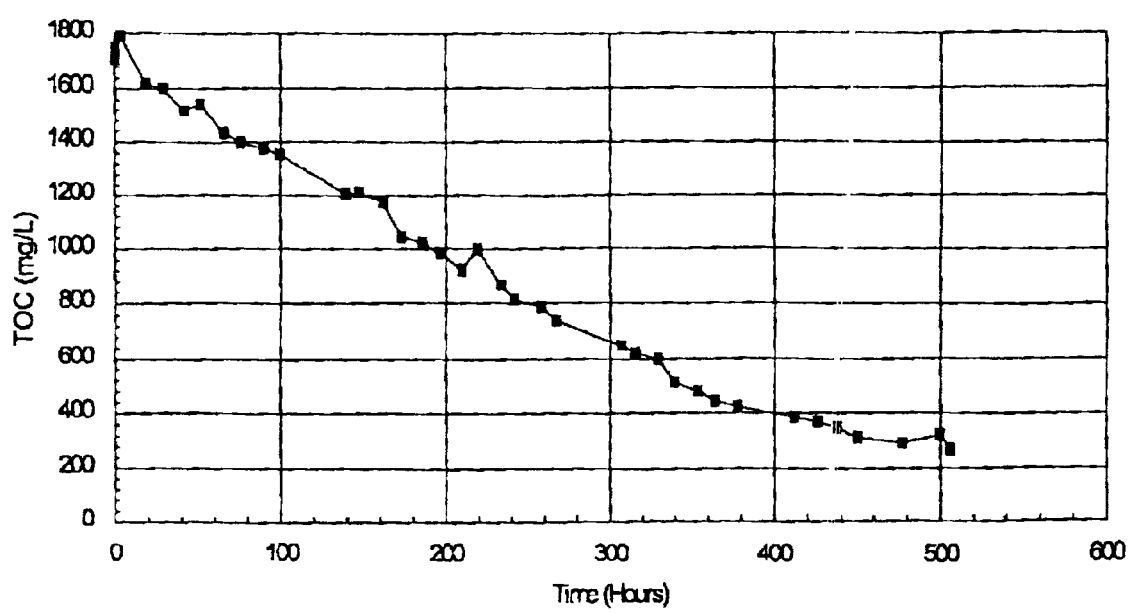
Figure 3: TOC versus Time
TySAR EP anode, 500 ml solution, 25 mA/cm2 at membrane

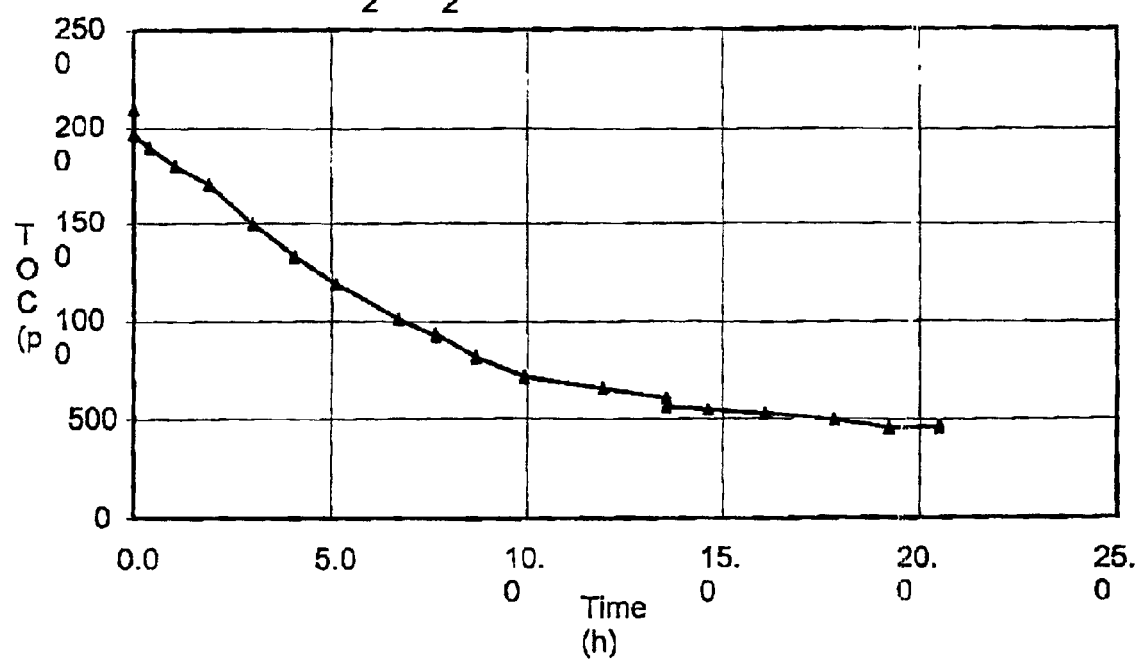
Figure 4: TOC removal from Plating Solution
10 cm$^2$ PbO$_2$/IrO$_2$/Ti Anode, 50 mA/cm$^2$, 100 ml sample

US 6,827,832 B2

ELECTROCHEMICAL CELL AND PROCESS FOR REDUCING THE AMOUNT OF ORGANIC CONTAMINANTS IN METAL PLATING BATHS

This application claims benefit of provisional application No. 60/171,477, filed Dec. 22, 1999.

FIELD OF THE INVENTION

This invention relates to the reduction of the amount of an organic contaminant as measured by the "total organic carbon" (TOC), in metal plating baths, and in particular to an electrochemical cell and process for selectively effecting such reduction by electrochemical oxidation.

BACKGROUND OF THE INVENTION

Most electroplating baths contain additives that are used to produce uniform and bright deposits of desired properties at economically desired rates. During plating, additives are both consumed and degraded, with the degradation products building up in the plating bath. As well, other organic contaminants are introduced into the plating baths from the surrounding environment (e.g. dust, plant spores) and from the parts being plated (e.g. photoresist film leaching encountered in printed circuit board plating). When these contaminants build up to high levels they begin to interfere with the proper action of the plating additives, resulting in poor quality deposits (typically a loss of ductility, adhesion or uniformity). This invention relates to a process for removing these problem, contaminating, compounds thus allowing continued use of the plating bath solution while maintaining good quality plating.

DESCRIPTION OF THE PRIOR ART

The problem contaminants are typically removed by adsorption on activated carbon, oxidation by hydrogen peroxide at elevated temperature, oxidation by ozone, or oxidation followed by adsorption. (The activated carbon can either be used in a cartridge form or by the addition of loose granulated activated carbon followed by solution filtration). A simpler process is desirable to avoid the handling of chemicals and/or the disposal costs for the activated carbon adsorbent. After use the activated carbon retains some plating solution and thus is contaminated by a metal ion and typically a strong acid, and for these reasons is classed as a hazardous waste. Thus an ideal process would not require the addition of strong chemicals nor would it produce any waste streams.

SUMMARY OF THE INVENTION

The invention involves an electrochemical process to break down the problem organic compounds in plating mixtures, by oxidation at the anode of an electrochemical cell. By oxidation it is meant that the problem compounds are eventually mineralised, which means that the carbon based organic contaminants are transformed into benign compounds such as water molecules, carbon dioxide, and in some cases sulphate and/or nitrate. The process is designed in such a way as to efficiency destroy the problem compounds, and to minimise other possible side reactions which might alter the properties of the plating solution. By meeting these objectives the described process can produce a product which can be recycled to the plating operations with minimal processing steps. It will be appreciated that the invention covers mainly solutions of low pH, but can be extended to other plating processes.

According to one aspect of the invention, an electrochemical cell is provided, comprising
  an anode compartment,
  an anode located in the anode compartment,
  an anolyte comprising an aqueous acidic solution containing an organic contaminant,
  a pump for circulating the anolyte through the anode compartment,
  a cathode compartment,
  a cathode located in the cathode compartment,
  a catholyte,
  a pump for circulating the catholyte through the cathode compartment,
  a separator between the anode and the cathode, comprising an ionically conducting solid polymer membrane material, and
  a power supply for supplying dc current to the cell, wherein the anode includes an active material which is stable at acid pH and at high electrical potential, and which selectively breaks down organic compounds by electrochemical oxidation, and wherein the separator preferentially allows the passage of protons over other ions.

According to another aspect of the invention, a process is provided for selectively electrochemically reducing the amount of an organic contaminant in an aqueous solution containing such contaminant, comprising providing an electrochemical cell, the electrochemical cell comprising
  an anode,
  a cathode,
  an ionically conductive separator between the anode and the cathode,
  a catholyte, and
  a dc power supply,
wherein the anode includes an active material which is stable at acid pH and at high electrical potential and which selectively breaks down organic compounds by electrochemical oxidation, and wherein the separator preferentially allows the passage of protons over other ions, the process comprising
  (a) providing an electrochemical cell, the electrochemical cell comprising
    an anode compartment,
    an anode located in the anode compartment,
    an anolyte comprising an aqueous acidic liquid mixture containing an organic contaminant,
    a first pump for circulating the anolyte through the anode compartment,
    a cathode compartment,
    a cathode located in the cathode compartment,
    a catholyte,
    a second pump for circulating the catholyte through the cathode compartment,
    a separator between the anode and the cathode, comprising an ionically conducting solid polymer membrane material, and
    a power supply for supplying dc current to the cell,
  wherein the anode includes an active material which is stable at acid pH and at high electrical potential, and which selectively breaks down organic compounds by electrochemical oxidation, and wherein the separator preferentially allows the passage of protons over other ions,
  (b) activating the dc power supply to provide electrical current to the cell,
  (c) activating the first pump to circulate the anolyte through the anode compartment to expose the liquid mixture to the anode to selectively break down the organic contaminant by electrochemical oxidation.

(d) activating the second pump to circulate the catholyte through the cathode compartment, and (e) removing the aqueous solution having a reduced amount organic contaminant from the anode compartment.

BRIEF DESCRIPTION OF THE DRAWINGS

FIGS. 2–4 are graphs illustrating the reduction of amount of organic contaminant over time, according to the invention.

DETAILED DESCRIPTION OF THE INVENTION

Figure 1:
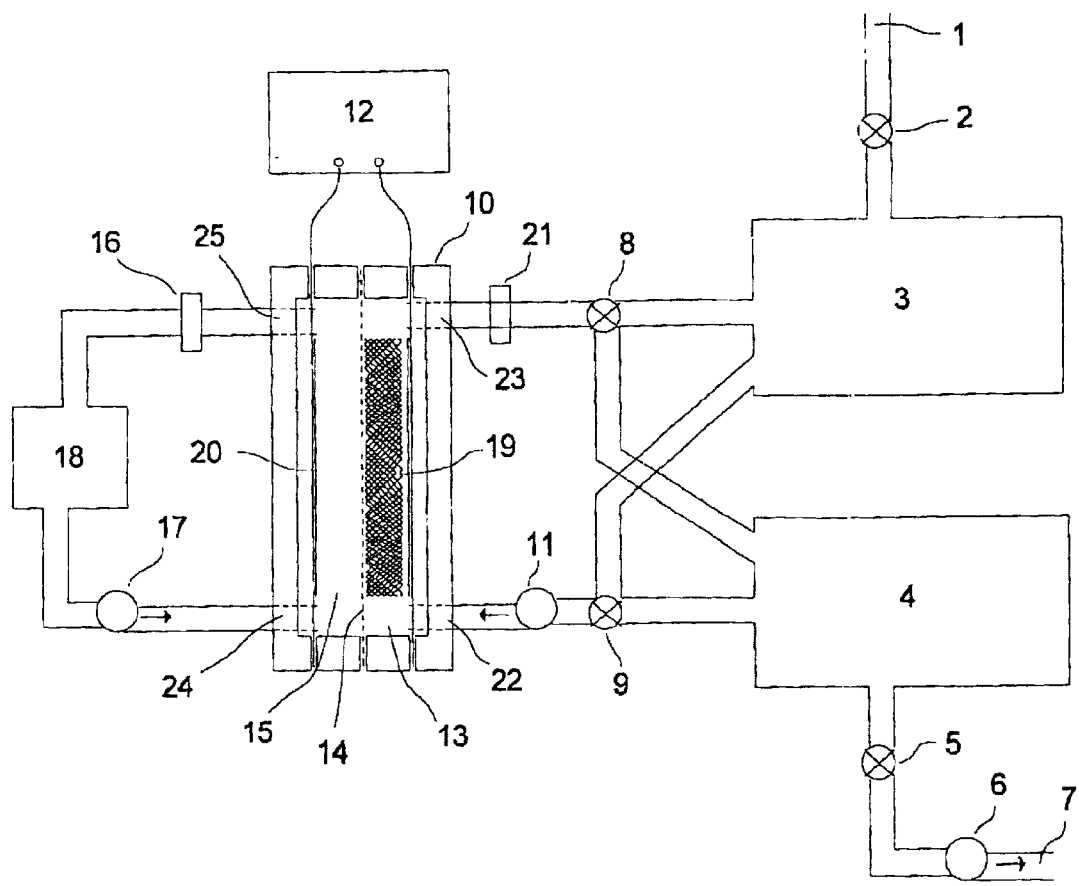
FIG. 1 is a schematic illustration of an exemplary process layout according to the invention.

An exemplary process layout is shown in FIG. 1, including an electrochemical cell 10, comprising an anode 19 and a cathode 20. The anode and cathode are respectively located in an anode compartment 13 and a cathode compartment 15, separated by a separator 14. The separator is made of a solid polymer Ionically conductive membrane material, which preferentially passes protons over other ions. A pump 11 is provided to circulate a solution to be treated (the anolyte) through the anode compartment. A second pump 17 is provided to circulate a second solution (the catholyte) through the cathode compartment. A power supply 12 provides DC current to the cell (and thus electrical potential between the anode and cathode).

In operation, in the layout shown, solution requiring treatment (anolyte) from a plating operation is pumped via pipe 1 into a holding tank 3 through valve 2, and the plating operation is refilled via pump 7 with previously treated solution from holding tank 4 using pump 6 and valve 5 (resulting in minimal plating operation downtime). The solution in the holding tank 3 (the anolyte solution) is then recirculated through the anode compartment(s) of the electrochemical cell or cells via valve 9 and pump 11, entering the anode compartment 13 via inlet 22 and leaving via outlet 23, then returning to the holding tank 3 via valve B. When the oxidation of the problem organic contaminants is sufficiently completed, i.e. that the contamination level is reduced to some target value, the outflow of the cell is directed to holding tank 4 under control of valve 8. When the holding tank 4 has been filled with plating solution, which is now free of problem levels of contaminants, the solution can be adjusted with fresh additives by means not shown, so as to be ready for reuse in the plating line. Throughout the treatment process the catholyte is recirculated from its reservoir, holding tank 18, using pump 17 and flowing through the cathode compartment(s) 15 of the electrochemical cell or cells via inlet 24 and outlet 25.

This layout indicates one possible method of carrying out the process. It should be noted that if the process was used to treat small Fractions of a plating line's total volume, in a semi-continuous batch mode, that only one holding tank might be used. Furthermore only a single set of anode, cathode and membrane are shown in FIG. 1 for simplicity. In an actual system a multitude of such anode, cathode, membrane sets would most likely be used. The cell used can be a closed top, filter press type cell, as shown in the diagram 10 and as is commonly used in electrochemical industry, or an open top cell capable of separate anolyte and catholyte flows with a membrane divider, as has been described in U.S. Pat. No. 5,972,181, the disclosure of which is incorporated herein by reference. It should also be noted that the electrochemical cell is shown with a high surface area anode 19. This represents one type of possible anode as will be discussed later.

For such a process to be useful, certain key features must be present in the cell, including an anode material which is stable in the solutions to be treated and conditions of interest e.g. law pH and high electrical potentials often used to break down organics, and provides sufficient activity for the break down of the target organic compounds, and a cell membrane which minimises the undesirable loss of metal from the solutions to be treated (by deposition at the electrochemical cell's cathode) and also does not result in a significant change in the solution chemical balance (by transport of water or ions other than protons). It is also useful to provide methods to keep the system chemistry in balance due to small amounts of material that will pass through the cell membrane and accumulate in the cathode compartment. Each of these points will be dealt with below.

Anode Material

By anode material we intend to refer to the active material which is at the surface of the anode because it is the anode's surface which is in contact with the solutions to be treated and therefore contributes most to the anode's performance. For reasons of conductivity, coating cost, and mechanical strength, industrial anodes are often fabricated by producing a coating of the desired active material on a metal substrate (e.g. a valve metal such as titanium or tantalum or any other substrate inert in the solution to be treated). It will also be appreciated that for some applications, the anode can be made of a solid active material.

As was stated above, a useful process requires an anode material that is stable in the solutions of interest and provides sufficient activity for the destruction of the target organic compounds. For example, many plating solutions contain relatively strong acids, and very few anode coatings are stable at the high potentials required to breakdown the organic contaminants. Of those anode coatings that are stable, not all provide sufficient activity for the destruction of the target compounds. Preferred active coatings are those that demonstrate, as well as stability, a poor catalytic activity for oxygen evolution. Three specific examples of electrode coatings that have been identified as viable choices for this process are: doped tin dioxide, lead dioxide, and platinum based coatings.

The anode coating of antimony doped tin dioxide is produced by the thermal decomposition technique similar to methods disclosed, for example, in U.S. Pat. Nos. 5,364,509 and 4,839,007 and in the literature (1), for use in waste water treatment. The disclosures of these references are incorporated herein by reference. In one example this involves dipping a titanium mesh substrate previously coated with two layers of tantalum doped iridium oxide, also produced by the thermal decomposition technique, Into a solution containing 0.1 g/L of $SbCl_3$ and 10 g/L of $SnCl_2$. The electrode is heated at 80° C. for 5 minutes, and than placed in an air circulating furnace at 500° C. for one hour. This procedure is repeated four times. After the last cycle, the electrode is heated at 550° C. for one hour. The heating and cooling cycles are performed in a ramping mode to avoid thermal shock and excessive cracking of the anode material.

Such antimony doped tin dioxide coated electrodes are known to be good at destroying organics (2). However, the literature also indicates that tin dioxide is thermodynamically unstable at low pH (below c.a. pH −0.3 (3)). We found however that the stability was acceptable even in fairy aggressive solutions such as those used in copper sulphate plating which typically contain 20 wt. % sulphuric acid. Furthermore it was found for the particular case of copper plating, low levels of tin and antimony are compatible with plating process. Both tin and antimony are standard impurities in copper anodes used to replenish the plating baths (4) and so the baths usually already contain these compounds.

It was also found that the current efficiency for the destruction of the target compounds was not strongly dependent on the electrode current density (i.e. the total current divided by the electrode surface area). This allows a wide range of electrode current densities to be used in this process. Electrode current densities from 1 to 200 mA/cm$^2$ were found to work for this process. We also found that to avoid excessive electrode corrosion yet achieve sufficient production rate, electrode current densities between 10 and 75 mA/cm$^2$ are preferred.

Lead dioxide electrodes can be fabricated by electrochemical deposition of lead dioxide on titanium substrates (often with an interlayer to enhance adhesion and prevent formation of titanium oxide as described for example in U.S. Pat. Nos. 5,683,567 and 4,822,459). Different additives are sometimes also used in such coatings (5,6). This anode was found to give efficiencies similar or slightly better than fin dioxide based coatings, though in some cases the stability was not as good.

Platinum based coatings were also found to perform satisfactorily under the proper operating conditions. Under normal operating conditions the efficiency of platinum for the destruction of organics has been reported in the literature to be much worse than that of tin dioxide (1). Platinum has also been reported to suffer significant corrosion in strong sulphuric acid and high current densities (7). We have found, however, that the performance and stability of platinum coated anodes is strongly dependent on current density and type of plating bath being treated. For tin and zinc plating baths, platinum coated anodes worked reasonably well in comparison with other anode materials at electrode current densities from 25 to 50 mA/cm$^2$. For copper plating baths however, the efficiency with platinum anodes was significantly lower than tin or lead oxide based anode coatings. In general, efficiency was found to improve with lower electrode current density. (One possible explanation for this might be a change in the mechanism of oxygen evolution on platinum at low current density related to a change in the oxidation state of surface platinum oxides (8)). Low electrode current densities are not normally used in industrial processes because of the poor production rate and hence poor return on investment, especially when using precious metal coatings. However, if somewhat more expensive platinum coated electrodes with a high surface area per volume are used, low electrode current densities can be used while still obtaining good production rates. Such electrodes can be obtained using; stacked screens, packed beds of beads, sintered fibre structures (TySAR-EP from Olin Co. as described by U.S. Pat. No. 5,294,319), or other similar geometry's known to those skilled in the art. These would be coated with platinum or a mixture of metals containing predominately platinum (e.g. platinum/iridium mixed oxide coatings). Using such an approach, in particular for the copper plating baths, currents below 10 mA/cm$^2$ electrode current density can provide good efficiency for the is destruction of the target organics with minimal corrosion, with electrode current densities below 2 mA/cm$^2$ being advantageous.

A summary of some of our results for various anodes for treating acidic plating solutions are listed in Table 1 below:

TABLE 1

| Electrode material or coating | Efficiency for organic destruction | Electrode stability |
| --- | --- | --- |
| Glassy carbon | good | Poor |
| Lead dioxide | very good | Medium |
| Iridium dioxide | very poor | Excellent |
| Platinum | poor | very good |

TABLE 1-continued

| Electrode material or coating | Efficiency for organic destruction | Electrode stability |
| --- | --- | --- |
| TySAR-IM ® (intermetallic) | very poor | Excellent |
| TySAR-EP ® (platinum) | good | Excellent |
| doped tin dioxide | very good | Good |

(Where TySAR materials are high surface area, coated, titanium fibre mat products of the Olin Co. as described in U.S. Pat. No. 5,294,319, the disclosure of which is incorporated herein by reference).

Thus it can be seen that superior results from the standpoint of efficiency and stability are provided by anode coatings including lead dioxide, high surface area electrodes with platinum based coatings, and doped tin dioxide coated electrodes. Of these, from the standpoint of efficiency and lower cost, the doped tin dioxide and lead dioxide coated electrodes are advantageous, especially when the application involves less corrosive solutions or where the corrosion products are less problematic (e.g. copper plating). In some other applications the platinum based anodes would be advantageous.

Membrane Selection

As was stated earlier the cell membrane acts to minimise the undesirable loss of metal from the solutions to be treated (by deposition at the electrochemical cell's cathode) and also should not result in a significant change in the solution chemical composition (by transport of water or ions other than protons).

The best isolation of the anode and cathode compartments can be obtained using a bipolar membrane (9) (e.g. Tokoyama Soda BP-1). Unfortunately problems were encountered with membrane fouling due to precipitation of metal ions inside the membrane where a high pH region occurs (caused by the water splitting which occurs at the centre of the bipolar membrane). While this problem could be decreased by running at low membrane current densities which results in a less extreme pH variation in the middle of the membrane, it would also result in a low production rate for the electrochemical cell.

Therefore various types of cation exchange membranes were evaluated for their ability to preferentially allow the passage hydrogen ions over metal ions. Good results were obtained using monovalent cation selective membranes (e.g. Tokoyama Soda Neosepta CMS or Asahi Glass HSF, U.S. Pat. Nos. 3,847,772 and 5,300,204 respectively the disclosures of which are incorporated herein by reference) and perfluorosulfonic acid cation membranes (e.g. Dupont Nafion®). These types of membranes are advantageous because of their ability to provide a good isolation of the anode and cathode solutions while passing reasonable current densities.

Mode of Operation

While the membrane materials described above provide good isolation of the anode and cathode solutions, they are not perfect. Perfect membranes would only allow the passage of protons (hydrogen ions), which would balance the hydrogen ions produced at the anode and consumed at the cathode, keeping both solutions unchanged by the process other than the oxidation of the undesirable organic contaminants and the electrolysis of a slight amount of water. It is therefore advantageous to provide methods to deal with the slow transfer of metal ions and water through the membrane.

Water is transported across the membranes by electroosmotic drag from the ions moving in the applied electric field. This results in the slow increase in catholyte volume.

We have found that by careful adjustment of the process conditions that the problem of electro-osmotic water transport can be eliminated. That is, by using a catholyte comprising a solution with a lower ionic strength than the anolyte (which is the plating solution being treated) a reverse osmosis transport of water back to the anolyte is provided. Accordingly, the reverse osmosis water transport from catholyte to anolyte, and the electo-osmotic water transport from anolyte to catholyte, can be made to cancel (for any given membrane current density). For example using an anolyte containing 2 M $H_2SO_4$ and a membrane current density of 90 mA/cm² through a monovalent cation membrane (Tokoyama Soda Neosepta CMS), a catholyte of about 0.2 M $H_2SO_4$ provided sufficiently lower ionic strength (compared to the anolyte) to produce a balancing reverse osmosis water flux. The lower ionic strength of the catholyte also works to counteract any slight electromigration of anions from the catholyte through the cation exchange membrane.

The metal ions which do make it through the membrane will be plated at the cathode. If the deposited metal is not removed it can eventually block the flowpath and/or grow across the cell, damaging the membrane and electrically shorting the electrodes.

One solution is to periodically remove and dean the cathodes. This is appropriate for an open top tank type call capable of holding membranes. It is also possible to periodically clean the cathodes without cell disassembly by recirculating a metal stripping solution such as 10 to 40% by volume nitric acid or dilute hydrogen peroxide to dissolve the plated metal. For this approach a cathode material which is resistant to oxidising agents, such as stainless steel, platinised titanium or titanium would be used.

It is advantageous however to have available additional methods that operate continuously to avoid or greatly reduce the frequency of cell maintenance and its resulting downtime. This is indicated in FIG. 1 by the metal removal and metal return units 16 and 21, respectively.

In one approach the metal ions are continuously removed from the catholyte using a small separate electrochemical cell in the recirculation loop (one possible form of the metal removal unit 16). If this cell is designed to efficiently remove metal ions (using for example a high surface area cathode), it can greatly increase the amount of time between cathode cleanings. Furthermore, in an enhanced version of this approach, the separate electrochemical call can also be used for cleaning the main cell cathodes between treatment runs. Using this method, after a treatment run the anolyte is drained from the main cell while the catholyte continues to recirculate. The cathodes in the main cell are then polarised anodically versus the cathode of the separate electrochemical cell in the recirculation loop. Metal, which has built-up on the cathodes of the main cell, would then dissolve and deposit in the external cell. For this enhanced approach the main cell cathodes must be of a metal which is stable both anodically and cathodically in the catholyte solution. For acidic catholyte solutions it is advantageous to use glassy carbon or a platinum coated cathode material.

A second approach involves the use of cathode designs that result in plated metal deposits having a poor adhesion to the cathode. If the metal deposit is then induced to fall off the cathode the metal removal from the catholyte flow can carried out using a settling or filtration unit (a second possible form of the metal removal unit 16). Materials which are known to exhibit poor adhesion of metals are typically oxide covered metals (such as titanium and stainless steel) and glassy carbon. For reasons of stability and cost stainless steel has advantages.

Two approaches have been used to dislodge the loosely adhering metal deposit. One approach involves the use of ultrasound. A second approach uses high electrode current densities that increase the fluffiness of the deposit and the rate per unit area of gas (hydrogen) bubbling. To achieve high electrode current densities on the cathode requires a small cathode area (for a given current). To do this while still maintaining an evenly distributed and lower current density on the anode, a technique was developed where-by large areas of the cathode were masked off. Cathodic current is allowed to flow through evenly spaced narrow slits cut in the masking material perpendicular to the catholyte flow direction. This allows for very high local cathodic electrode current densities to be achieved while maintaining a fairly evenly spread flow of current to the anode. Furthermore, by using a slit shaped cathode geometry, metal that does collect is only attached by a narrow base perpendicular to the catholyte flow and therefore more easily dislodged. Using these approaches the time between required maintenance can be greatly increased, thus reducing the process operating costs.

The metal ion level in the treated solution can be readjusted by the addition of fresh metal salts in holding tank 4 before reusing the solution. An alternative approach involves returning the metal collected in the metal recovery unit 16, described above, using the metal return unit 21, as shown in FIG. 1. This recovered metal would be in the form of either the metal loaded high surface area cathode, if a separate external eletrochemical cell is used, or metal powder if the solid metal is dislodged from the main cell cathodes and removed from the catholyte by filtering or settling. The metal return unit 21 may be in the form of a vessel located at the anolyte outlet 23 from the main treatment cell. The recovered metal is slowly re-dissolved in the oxygen saturated solution coming from the anolyte compartment, if it is an easily oxidised metal. Otherwise, the high surface area cathode or the collected metal powder (if it is collected for example on a titanium mesh basket) can be electrically connected to the treatment cell anode to speed the re-dissolution.

EXAMPLE 1

A 0.5 L solution of spent copper plating solution (2M $H_2SO_4$ and 20 g/L copper) with a unacceptably high level of degradation products as indicated by a high "total organic carbon" measurement (TOC 1700 ppm) was recirculated through a filter press type flow-by cell (A micro-flowcell manufactured by the AB Electrocell Co.). The cell anode was composed of two layers of stacked titanium mesh coated with antimony doped tin oxide (giving 24 cm² anode area). A 316 stainless steel cathode was used with a 10 cm² active area. The cell anode and cathode compartments were separated with a 10 cm² bipolar membrane and a 2 M $H_2SO_4$ catholyte was used. The solution was recirculated at 200 ml/min and a total current of 250 mA was applied giving an electrode current density of 10.4 mA/cm² and a membrane current density of 25 mA/cm². The TOC level in the solution decreased as is shown in FIG. 2. At the end of the run only 0.01 g of copper was found at the cathode. The catholyte volume was essentially unchanged and the anolyte volume was around 450 ml and was made up to 500 ml with distilled water.

EXAMPLE 2

A 0.5 L solution of spent copper plating solution (2M $H_2SO_4$ and 20 g/L copper) with a unacceptably high level of degradation products (TOC 1800 ppm) was recirculated through a filter press type flow-by cell as described in Example 1. The cell anode was a 3.175 mm thick sheet of platinum coated titanium fibre mat with an approximate area of 286 cm² ("TySAR EP" as described in U.S. Pat. No. 5,294,319). A total cell current of 250 mA was used, giving an electrode current density of 0.9 mA/cm² and a membrane current density of 25 mA/cm$^2$. The TOC level in the solution decreased as is shown in FIG. 3. At the end of the run only 0.01 g of copper was found at the cathode. The catholyte volume was essentially unchanged and the anolyte volume was around 405 ml and was made up to 500 ml with distilled water.

EXAMPLE 3

A 0.1 L solution of spent copper plating solution (2M H$_2$SO$_4$ and 20 g/L copper) with a unacceptably high level of degradation products (TOC 2000 ppm) was recirculated through a filter press type flow-by cell as described in Example 1. In this case the cell anode had a coating of lead dioxide over an interlayer of iridium dioxide on a titanium plate substrate with an area of 10 cm$^2$, and the cell membrane was a monovalent cation membrane (Tokuyama CMS). Also a current of 500 mA was used, giving electrode and membrane current densities of 50 mA/cm$^2$. The TOC level in the solution decreased as is shown in FIG. 4.

EXAMPLE 4

A 20 L solution of spent copper plating solution (2M H$_2$SO$_4$ and 20 g/L copper) with a unacceptably high level of degradation products (TOC 1850 ppm) was recirculated through a filter press type flowby cell with two anodes and two cathodes (An MP flowcell manufactured by the AB Electrocell Co.). The cell anodes were composed of three layers of stacked titanium mesh coated with antimony doped tin oxide. The cathodes were stainless steel and the catholyte was 2 M H$_2$SO$_4$. The cell anode and cathode compartments were separated with a bipolar membrane (Tokuyama Soda BP-1) and the system run at a current of 6 A, giving a membrane current density of 30 mA/cm$^2$. The solution was recirculated at 1.25 L/min. The TOC level in the solution was decreased to 950 ppm in 645 h. The catholyte volume was maintained over the run by the addition of water. The final anolyte volume was around 19 L. After readjusting the anolyte volume to 20 L with water the copper and sulphuric acid concentrations were virtually unchanged from the starting levels. Fresh plating additives were then added to the treated solution and copper test blanks were plated. The plated blanks were tested for tensile strength and ductility and found to have acceptable properties.

EXAMPLE 5

A 10 L solution of spent copper plating solution (2M H$_2$SO$_4$ and 20 g/L copper) with a unacceptably high level of degradation products (TOC 1850 ppm) was recirculated through the filter press flow-by cell described in Example 4 but with only one anode and one cathode. The cell anode and cathode compartments were separated with a monovalent cation membrane (Tokuyama Soda Neosepta CMS) and the system run at a membrane current density of 90 mA/cm$^2$. The catholyte was 0.2 M sulphuric acid compared to about 2 M sulphuric acid in the copper plating solution. The TOC level in the solution decreased to 425 ppm in 380 h. The catholyte volume was maintained over the run by the addition of water, The final anolyte volume was around 11 L. Copper collected at the cathode amounted to about 8 g, which was less than 6% of the initial copper in the plating solution.

EXAMPLE 6

A small H-type cell was used with a SnO2/Ti anode and a platinum gauze cathode. The anolyte was copper plating solution containing about 2 M H$_2$SO$_4$ and 20 g/L copper and the catholyte was 2 M HSO$_4$. The cell was separated with a bipolar membrane (Tokuyama soda BP-1). The call was run at membrane current densities of 30, 35, 40, and 45 mA/cm$^2$ for about 10 hours at each value. At the end of this time there was no visible copper on the cathode however the precipitation of copper within the membrane was observed at 45 mA/cm$^2$. When the test was repeated with a catholyte of 4 M H$_2$SO$_4$ the membrane fouling point was raised to 50 mA/cm$^2$.

From longer term runs using the bipolar membrane (as described in Examples 1 and 2) the data shown in Table 2 below were complied for the percentage of the charge flowing through the membrane carried by copper ions:

TABLE 2

| Total charge passed (C) | Copper on cathode (g) | Current efficiency of copper transport (%) |
|---|---|---|
| 696767 | 0.05 | 0.022 |
| 455220 | 0.01 | 0.007 |
| 370380 | 0.01 | 0.008 |
| 273075 | 0.03 | 0.033 |
| 765429 | 0.02 | 0.008 | for an average copper transport efficiency of 0.02% (with a standard deviation of 0.01).

EXAMPLE 7

A small H-type cell as described in Example 6, but with a 0.5 M H$_2$SO$_4$ catholyte, was used to test various cation membranes. Tests were carried out with a membrane current density of 40 mA/cm$^2$ until significant copper was visible on the cathode. The cathode was then removed, the copper deposit weighed, and the current efficiency for copper transport was calculated. The results are shown in Table 3 as follows:

TABLE 3

| Membrane | Total charge passed (C) | Copper on cathode (g) | Current efficiency of copper transport (%) |
|---|---|---|---|
| Perfluorinated cation (Nafion 117) | 51840 | 0.0452 | 0.27 |
| Polystyrene cation (ESC 7000) | 36540 | 0.176 | 1.47 |
| Polystyrene monovalent cation (Tokuyama CMS) | 69300 | 0.0642 | 0.28 |
| Polysulfone monovalent cation (Asahi HSF) | 342360 | 0.267 | 0.24 |

EXAMPLE 8

An acid tin plating solution having an unacceptable TOC level of 4700 ppm was treated in a double H-type membrane cell with a doped tin dioxide anode, platinum cathodes and a Nafion membrane. The anolyte solution has a tin content that varies between 20 to 60 g/l, and a free sulphuric acid content that varies between 30 and 80 g/l. A volume of about 200 ml was treated for 144 h at an anode current density of 25 mA/cm$^2$ (0.56 A total) and the TOC was reduced to 2500 ppm.

EXAMPLE 9

An acid tin plating solution having an unacceptable TOC level of 5500 ppm was treated in a double H-type membrane cell with a platinum based anode, platinum cathodes and Tokuyama CMS membranes. The anolyte solution has a tin content that varies between 20 to 60 g/l, and a free sulphuric acid content that varies between 30 and 80 g/l. A volume of about 200 ml was treated for 72 h at an anode current density of 50 mA/cm² (1.12 A total) and the TOC was reduced to 3500 ppm.

EXAMPLE 10

An acid tin plating solution having an unacceptable TOC level of 5500 ppm was treated in a double H-type membrane cell with a lead dioxide anode, platinum cathodes and Tokuyama CMS membranes. The anolyte solution has a tin content that varies between 20 to 60 g/l, and a free sulphuric acid content that varies between 30 and 80 g/l. A volume of about 200 ml was treated for 64 h at an anode current density of 50 mA/cm² (1.30 A total) and the TOC was reduced to 910 ppm.

EXAMPLE 11

An acid zinc plating solution having an unacceptable TOC level of 960 ppm was treated in a double H-type membrane cell with a doped tin dioxide anode, platinum cathodes, and Nafion membranes. The anolyte solution has a zinc content that varies between 7 and 40 g/L, a total chloride that varies between 130 and 220 g/l, and ammonium chloride of a minimum concentration of 200 g/l. A volume of about 200 ml was treated for 30 h at an anode current density of 25 mA/cm² (0.56 A total) and the TOC was reduced to 810 ppm.

EXAMPLE 12

An acid zinc plating solution having an unacceptable TOC level of 3600 ppm was treated in a double H-type membrane cell with a platinum based anode, platinum cathodes, and Tokuyama CMS membranes. The anolyte solution has a zinc content that varies between 7 and 40 g/L, a total chloride that varies between 130 and 220 g/l, and ammonium chloride of a minimum concentration of 200 g/l. A volume of about 200 ml was treated for 30 h al an anode current s density of 25 mA/cm² (0.56 A total) and the TOC was reduced to 1400 ppm.

EXAMPLE 13

An acid zinc plating solution having an unacceptable TOC level of 3600 ppm was treated in a double H-type membrane cell with a lead dioxide anode, platinum cathodes, and Tokuyama CMS membranes. The anolyte solution has a zinc content that varies between 7 and 40 g/L, a total chloride that varies between 130 and 220 g/l, and ammonium chloride of a minimum concentration of 200 g/l. A volume of about 200 ml was treated for 26 h at an anode current density of 25 mA/cm² (0.65 A total) and the TOC was reduced to 1600 ppm.

References

1. Correa-Lozano, B., Comninellis, Ch., and De Battisti, A., J. Applied. Electrochem., 27, (1997), 970–4.
2. Comninellis, C., "Electrochemical treatment of wastewater containing organic pollutants", Proc. Electrochem. Soc., Vol. 9010, (1990), p.71–87.
3. Pourbaix, M., "Atlas of Electrochemical Equilibria in Aqueous Solutions", NACE, Houston, Tex., (1974), p.475–84.
4. Tuddenham, W. M., and Dougall, P. A., in "Kirk-Othmer Encyclopedia of Chemical Technology, 3rd Ed.", John Wiley & Sons, New York, (1979), Vol. 6, p. 858–69.
5. Kawagoe, K. T. and Johnson, D. C., J. Electrochem. Soc., 141(12), (1994), p.3404–9.
6. Belhadj Tahar, N. and Savall, A., J. Applied Electrochem., 29 (1999), p.277–83.
7. Ota, K-I., Nishigori, S., and Kamiya, N., J. Electroanal. Chem., 257, (1988), p.205–15.
8. Conway, B. E., and Liu, T. C., Materials Chem. and Physics, 22, (1989), p.163–82.
9. Frilette, V. J., J. Phys. Chem., 60, (1956), p.435–9.

What is claimed is:

1. An electrochemical cell comprising
    an anode compartment,
    an anode located in the anode compartment,
    an anolyte comprising an aqueous acidic metal plating solution containing an organic contaminant and a metal ion,
    a pump for circulating the anolyte through the anode compartment,
    a cathode compartment,
    a cathode located in the cathode compartment,
    a catholyte,
    a pump for circulating the catholyte through the cathode compartment,
    a separator between the anode and the cathode, comprising an ionically conducting solid polymer membrane material, and
    a power supply for supplying dc current to the cell,
    wherein the anode includes an active material which is stable at acid pH and at high electrical potential, and which selectively breaks down organic compounds by electrochemical oxidation, and wherein the separator minimizes the loss of metal ions from the anolyte.
2. An electrochemical cell according to claim 1, wherein the anode active material is in the form of a solid material, or a coating of active material on a solid substrate.
3. An electrochemical cell according to claim 2, wherein the solid material or solid substrate is a high surface area material.
4. An electrochemical cell according to claim 3, wherein the solid substrate is a metal substrate.
5. An electrochemical cell according to claim 4, wherein the active material coating comprises tin dioxide, lead dioxide or platinum based materials.
6. An electrochemical cell according to claim 5, wherein the metal substrate is titanium.
7. An electrochemical cell according to claim 1, wherein the cathode is of a material selected from the group consisting of stainless steel and titanium, which may include an oxide layer, glassy carbon and platinum based materials.
8. An electrochemical cell according to claim 1 wherein the separator is a cation exchange membrane, which preferentially allows the passage of protons over other ions.
9. An electrochemical cell according to claim 8, wherein the catholyte comprises an aqueous acidic solution wherein the catholyte is of a lower ionic strength than that of the anolyte.
10. An electrochemical cell according to claim 1, wherein the separator is a perfluorinated cation membrane.
11. An electrochemical cell according to claim 1, wherein the separator is a monovalent cation selective membrane selected from polystyrene monovalent and polysulfone monovalent membranes.
12. An electrochemical cell according to claim 1, wherein the separator is a bipolar membrane.
13. An electrochemical cell according to claim 1, wherein the cell additionally comprises a metal removal and return unit, for removing metal and/or metal ions from the catholyte.
14. An electrochemical cell according to claim 13, wherein the metal plating solution selected from copper, tin and zinc plating baths.

15. A process for electrochemically reducing the amount of an organic contaminant in an aqueous metal plating solution containing such contaminant, comprising
(a) providing an electrochemical cell, the electrochemical cell comprising
an anode compartment,
an anode located in the anode compartment,
an anolyte comprising an aqueous acidic liquid metal plating solution
containing an organic contaminant and a metal ion,
a first pump for circulating the anolyte through the anode compartment,
a cathode compartment,
a cathode located in the cathode compartment,
a catholyte,
a second pump for circulating the catholyte through the cathode compartment,
a separator between the anode and the cathode, comprising an ionically conducting solid polymer membrane material, and
a power supply for supplying dc current to the cell,
wherein the anode includes active material which is stable at acid pH and at high electrical potential, and which selectively breaks down organic compounds by electrochemical oxidation, and wherein the separator minimizes the loss of metal ions from the anolyte,
(b) activating the dc power supply to provide electrical current to the cell,
(c) activating the first pump to circulate the anolyte through the anode compartment to expose the aqueous solution to the anode to selectively break down the organic contaminant by electrochemical oxidation,
(d) activating the second pump to circulate the catholyte through the cathode compartment, and
(e) removing the aqueous metal plating solution having a reduced amount organic contaminant from the anode compartment.

16. A process according to claim 15, wherein the anode current density is in the range of 1–200 mA/cm$^2$.

17. A process according to claim 16, wherein the anode current density is in the range of 10–75 mA/cm$^2$.

18. A process according to claim 15, wherein the catholyte comprises an aqueous acidic solution, and wherein the ionic strength of the catholyte solution is adjusted to provide a lower ionic strength than that of the anolyte to balance the water flux through the membrane.

19. A process according to claim 18, wherein the metal ion, is selected from the group consisting of copper, zinc and tin.

20. A process according to claim 19, additionally comprising removing the catholyte to remove metal and/or metal ions therefrom and returning the catholyte to the cell.

21. A process according to claim 16, wherein the anode material is a stable substrate coated with an active layer of platinum based material.

22. A process according to claim 15, wherein the anode material is a high surface area predominately platinum coated anode run at a low current density below 10 mA/cm$^2$.

23. A process according to claim 22, wherein the current density is below 2mA/cm$^2$.

24. A process according to claim 15, wherein the separator is a bipolar membrane, and wherein the current density through the membrane provided by the power supply is kept below the threshold for metal precipitation.

25. A process according to claim 18, wherein metal deposits on the cathode are removed without cell disassembly by periodic anodic polarisation versus an additional electrode external to the electrochemical cell.

26. A process according to claim 18, wherein the cathode is an oxide forming metal or glassy carbon to which metals deposits are poorly adherent.

27. A process according to claim 18, wherein the poorly adherent metal deposits on the cathode are removed without cell disassembly by periodic application of ultrasound and collection of the metal particles from the catholyte flow.

28. A process according to claim 18, wherein the poorly adherent metal deposits an the cathode are dislodged by masking areas of the cathode to produce local high current densities which result in loose, fluffy, poorly adherent metal deposits which can be detached by the catholyte flow and the high local rate of gas evolution.

29. A process according to claim 18, wherein metal deposits on the cathode are removed without cell disassembly by periodic recirculating of a metal stripping solution such as diluted nitric acid or hydrogen peroxide.

30. A process according to claim 15, wherein prior to step (b), the contaminated metal plating solution is transferred to the anode compartment from a metal plating operation.

31. A process according to claim 30, wherein the process is a continuous process.

* * * * *